United States Patent [19]

Uehara

[11] Patent Number: 4,961,132
[45] Date of Patent: Oct. 2, 1990

[54] SYSTEM FOR PROCESSING COMMUNICATIONS AMONG CENTRAL PROCESSING UNITS

[75] Inventor: Izushi Uehara, Tokyo, Japan

[73] Assignee: NEC Corporation, Tokyo, Japan

[21] Appl. No.: 150,276

[22] Filed: Jan. 29, 1988

[30] Foreign Application Priority Data

Jan. 29, 1987 [JP] Japan .................................. 62-17391

[51] Int. Cl.⁵ ...................... G06F 15/16; G06F 13/00; G06F 9/38
[52] U.S. Cl. .................................... 364/200; 364/900; 364/228; 364/230.3; 364/281.3; 364/284.4; 364/268.1; 364/270.5; 364/931.4; 364/242.5; 364/948.11; 364/948.32
[58] Field of Search ... 364/200 MS File, 900 MS File

[56] References Cited

U.S. PATENT DOCUMENTS

| 3,648,253 | 3/1972 | Mullery et al. | 364/200 |
| 4,459,664 | 7/1984 | Pottier et al. | 364/200 |
| 4,503,499 | 3/1985 | Mason et al. | 364/200 |
| 4,649,473 | 3/1987 | Hammer et al. | 364/200 |
| 4,803,613 | 2/1989 | Kametani et al. | 364/200 |
| 4,807,118 | 2/1989 | Lin et al. | 364/200 |

Primary Examiner—Michael R. Fleming
Assistant Examiner—Gopal C. Ray
Attorney, Agent, or Firm—Sughrue, Mion, Zinn, Macpeak & Seas

[57] ABSTRACT

A system applicable to a multiprocessor system for processing communications among central processing units (CPUs) in which, when one of the CPUs has sent process requests to a plurality of the other CPUs at the same time, end-of-process requests appearing asynchronously to each other are processed. If the CPUs to which the requests are meant for have ended processing normally, ending of all the kinds of processing can be completed within a short period of time and without restoring to complicated firmware processing. Even if the end condition at any CPU is abnormal, the firmware processing is simplified because the end reports are selectively returned based on a predetermined priority order.

1 Claim, 3 Drawing Sheets

SYSTEM FOR PROCESSING COMMUNICATIONS AMONG CENTRAL PROCESSING UNITS

BACKGROUND OF THE INVENTION

The present invention relates to processing of communications among central processing units (CPUs) in a multiprocessor system and, more particularly, to a system for processing end-of-process reports which are generated asynchronously to each other when process requests are applied from one CPU to others at the same time.

In a multiprocessor system, it often occurs that one CPU needs access to another or other CPUs for requesting processing while its own processing is under way. It is, therefore, a common practice to construct a multiprocessor system such that CPUs are capable of communicating with each other to interchange requests for processing. Specifically, in a multiprocessor system having two CPUs, after one CPU has sent a request for processing to the other CPU, the former awaits the end of processing by the latter and, upon reception of an end-of-process report, advances to the next processing based on the content of the report. On the other hand, in a multiprocessor system having three or more CPUs, in the case that one CPU desires access to a plurality of other CPUs for requesting processing, the intervals of processing time of the CPUs to be accessed are different from each other and, moreover, the end-of-process report is sometimes different from one CPU to another. For this reason, there is adopted either one of two different procedures: one in which, as in the multiprocessor system having two CPUs, a process request is sent to one CPU and, upon the arrival of an end-of-process report from that CPU, a process request is sent to another CPU, and the other in which process requests are sent to a plurality of CPUs at the same time while the resulting end-of-process reports are monitored on a CPU-by-CPU basis by firmware to be processed one after another.

As stated above, in a multiprocessor system having three or more CPUs, one CPU has to send a process request to another CPU, then await an end-of-process report from the latter, and then access still another CPU by sending a process request thereto or, alternatively, it has to process end-of-process reports sequentially on a CPU basis. Even if the kinds of processing requested to a plurality of CPUs are the same or even if a plurality of CPUs can execute processing in parallel with each other, it is necessary to request the individual CPUs processing one after another or to use complicated firmware processing. Hence, as the number of CPUs which are accessed increases, the period of time necessary for all the kinds of processing to be completed is increased.

SUMMARY OF THE INVENTION

It is, therefore, an object of the present invention to provide a system for processing communications among CPUs which reduces the period of time necessary for processing.

It is another object of the present invention to provide a system for processing communications among CPUs which simplifies firmware processing.

In accordance with the present invention, in a communication processing system having a plurality of central processing units (CPUs), each of the CPUs comprises a memory for storing information associated with the other CPUs with which the CPU is communicating, an end detecting circuit for detecting end of processing at all of the other CPUs to which processing request have been sent by monitoring end-of-process reports from the other CPUs while referencing contents of the memory, and a selecting circuit for selecting or combining the end-of-process reports from the other CPUs according to a predetermined priority order by referencing the contents of the memory. The CPU which request processing delivers process requests to a plurality of the other CPUs at the same time and deciding end-of-process reports, which are asynchronously returned from the other CPUs which have received the requests, to be an end report based on an output of the end detecting circuit and an output of the selecting circuit.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
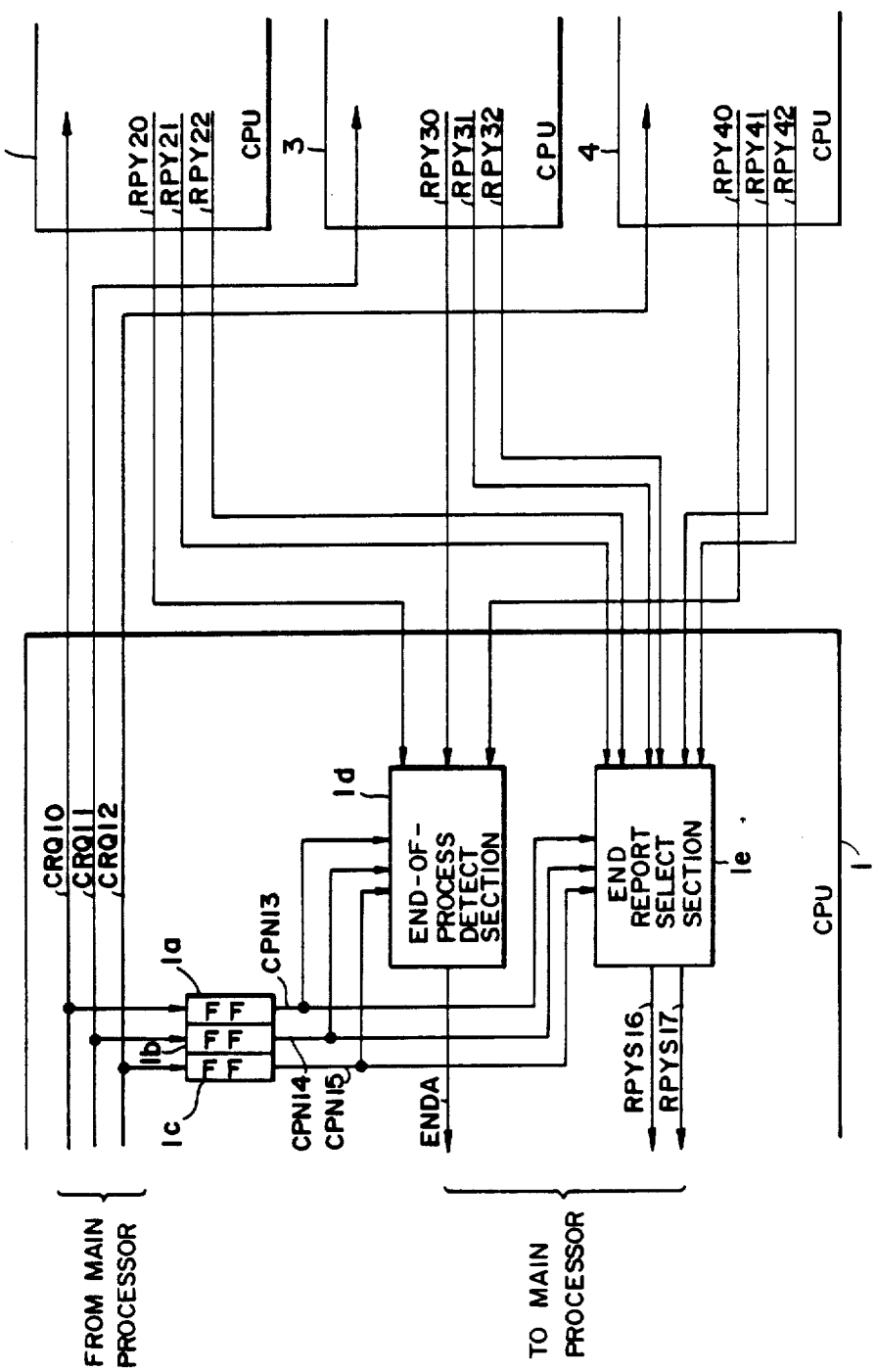
FIG. 1 is a schematic block diagram showing a processing system embodying the present invention.

Referring to FIG. 1 of the drawings, a processing system for communications among CPUs embodying the present invention is shown which is applied to a multiprocessor system having four CPUs by way of example. Assume that a CPU 1 sends communication request to CPUs 2 to 4 at the same time. First, the CPU 1 writes the contents of process requests associated with the individual CPUs 2 to 4 in predetermined addresses of a main memory, not shown. When the CPU 1 makes all the communication request signals CRQ10 to CRQ12 a (logical) ONE, flip-flops (FFs) 1a to 1c of the CPU 1 adapted to show busy CPUs are all set to a ONE while, at the same time, communication request signals CRQ10 to CRQ12 are sent to the CPUs 2 to 4, respectively. In response to the signals CRQ10 to CRQ12, the CPUs 2 to 4 generates interruptions to firmware so that the contents of the main memory are read out and fed to the individual CPUs 2 to 4. In response, the CPUs 2 to 4 execute processing in parallel with each other according to the process requests which are meant therefor. Upon completion of the processing, the CPUs 2 to 4 return, respectively, end-of-process signals RPYi0 (i=2 to 4) and end condition signals RPYi1 and RPYi2 (i=2 to 4) to the CPU 1. Each of the end condition signals RPYi1 and RPYi2 has one bit, i.e., they have two bits in combination. Let it be assumed that the end condition signals RPYi1 and RPYi2 are representative of normal end when they are a ONE and a ZERO, respectively, abnormal end when they are a ZERO and a ONE, respectively, and questionable end when both of them are a ONE. Ending the processing asynchronously, the CPUs 2 to 4 send the end-of-process signals RPYi0 to an end-of-process detecting section 1d of the CPU 1. A specific construction of the end-of-process detecting section 1d is shown in FIG. 2.

Figure 2:
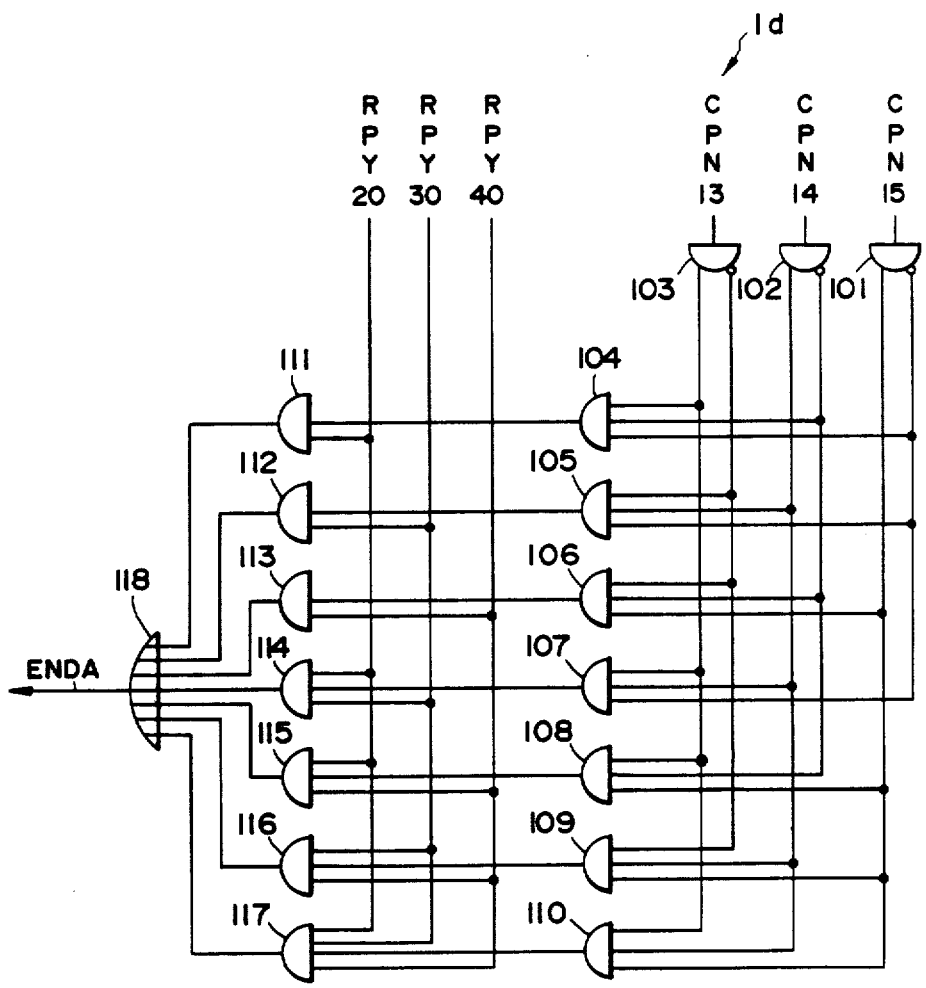
FIG. 2 is a diagram schematically showing a specific construction of an end-of-process detecting section which is included in the system of FIG. 1.

Referring to FIGS. 1 and 2, since communication requests are delivered to all the CPUs 2 to 4 as stated above, all the FFs 1a to 1c are a ONE and, therefore, CPU busy signals CPN 13 to 15 which are associated with the CPUs 2 to 4, respectively, are all a ONE. The CPU busy signals CPN 13 to 15 are applied to AND gates 104 to 110 via gates 101 to 103, as illustrated. In this condition, only the output of the AND gate 110 is a ONE. The outputs of the AND gates 104 to 110 are coupled to AND gates 111 to 117, respectively. Hence, when all the end-of-process signals RPY10, RPY20 and RPY30 become a ONE, the output of the AND gate 117 becomes a ONE. Specifically, when all the CPUs 2 to 4 complete their processing, an end-of-process signal ENDA appearing on the output of an OR gate 118 becomes a ONE. With this construction, the end-of-process detecting section 1d capable of detecting that all the kinds of processing which the CPU 1 requested have been completed.

Figure 3:
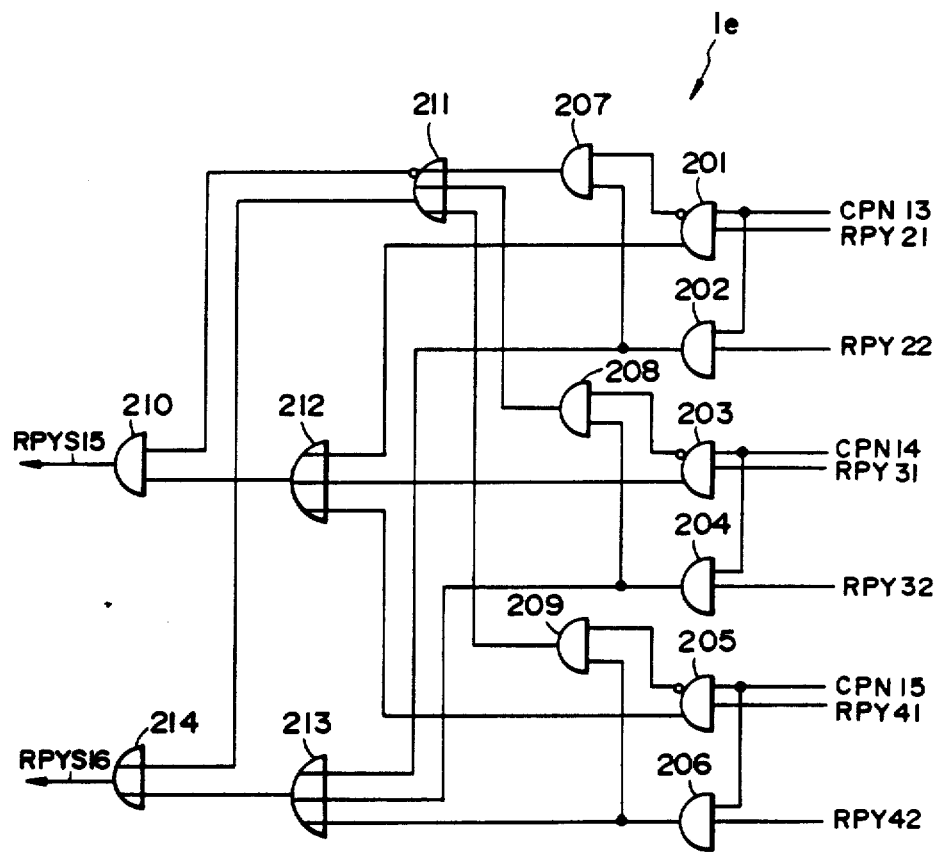
FIG. 3 is a diagram schematically showing a specific construction of an end report selecting section as also included in the system of FIG. 1.

The end condition signals RPYi1 and RPYi2 from the CPUs 2 to 4 are routed to an end report selecting section 1e of the CPU 1. A specific construction of the end report selecting section is shown in FIG. 3. Assume that the end condition at the CPU 2 is normal, that at the CPU 3 is questionable, and that at the CPU 4 is abnormal. In this condition, the end condition signals RPY21 and RPY22 are a ONE and a ZERO, respectively; the end condition signals RPY31 and RPY32 are ONEs; and the end condition signals RPY41 and RPY42 are a ZERO and a ONE, respectively. As stated earlier, the CPU busy signals CPN 13 to 15 are all a ONE because the CPU 1 is in communication with all the other CPUs 2 to 4. Since the end condition signals RPY21 and RPY22 from the CPU 2 are a ONE and a ZERO, respectively, a ONE and a ZERO are applied to, respectively, OR gates 212 and 213 via AND gates 201 and 202. Since the end condition signals RPY31 and RPY32 from the CPU 3 are ONEs, a ONE is applied to each of the OR gates 212 and 213 via AND gates 203 and 204, respectively. Further, since the condition signals RPY 41 and RPY 42 are a ZERO and a ONE, respectively, a ZERO and a ONE are applied to the OR gates 212 and 213 via AND gates 205 and 206, respectively. As a result, a ONE appears on the output of each of the OR gates 212 and 213.

However, despite that both the outputs of AND gates 207 and 208 are a ZERO, the output of an AND gate 209 is a ONE because the end condition signals RPY41 and RPY42 associated with CPU4 are a ZERO and a ONE, respectively. Consequently, the output of positive polarity of an OR gate 211 becomes a ONE. It follows that the inputs to an AND gate 210 are a ZERO and a ONE, respectively, and those to an OR gate 214 are ONEs. Hence, a ZERO and a ONE appear on the outputs of the AND gate 210 and OR gate 214, respectively, and are delivered as end report result signals RPYS15 and RPYS16 which are a ZERO and a ONE, respectively.

On the other hand, when the end condition of the CPU4 is normal, the end condition signals RPY41 and RPY42 are a ONE and a ZERO, respectively. In this condition, the AND gate 209 does not become a ONE, i.e., the output of the AND gate 209 is a ZERO so that the positive polarity of the OR gate 211 becomes a ZERO. Hence, a ONE appears on each of the outputs of the OR gates 212 and 213 resulting that both the end report result signals RPYS 15 and RPYS16 become a ONE.

As stated above, the end condition selecting section 1e selects the end condition signals associated with the CPUs in priority order of "ZERO, ONE", "ONE, ONE" and "ONE, ZERO" so as to reflect them in the end report result signals RPYS15 and RPYS16.

Assuming that the CPU 1 sends communication request to the CPUs 2 and 3, only the FFs 1a and 1b are set to a ONE. Therefore, the end-of-process detecting section 1d and end report selecting section 1e neglect an end report from the CPU 4 and, upon arrival of end-of-process signals from both of the CPUs 2 and 3, detect the end of processing and select end condition signals from the CPUs 2 and 3 based on the previously stated priority order.

When the end-of-process signal ENDA and the end report result signals RPYS15 an RPYS16 which are fed to the CPU 1 are representative of an abnormal end, end condition history registers, not shown, which are built in the individual CPUs are read out to execute processing based on the end conditions.

It will be apparent that the construction shown and described in relation to the CPU 1 may be installed in all the other CPUs 2 to 4 so as to allow all the CPUs 1 to 4 to interchange communication requests with each other.

No doubt, the number of CPUs included in a multiprocessor system is not limited to four as shown and described and may be smaller than or greater than four.

In summary, it will be seen that in accordance with the present invention process request can be sent to a plurality of CPUs at the same time and, if the CPUs to which the requests are meant for have ended processing normally, ending of all the kinds of processing can be completed within a short period of time and without resorting to complicated firmware processing. In addition, even if the end condition at any CPU is abnormal, the firmware processing is simplified because the end reports are selectively returned based on a predetermined priority order.

Various modifications will become possible for those skilled in the art after receiving the teachings of the present disclosure without departing from the scope thereof.

What is claimed is:

1. In a communication processing system having a plurality of central processing units (CPUs), including a requesting CPU for requesting service from other CPUs in said plurality, said other CPUs operating concurrently in response to said requests for service said requesting CPU comprising:

storing means for storing information identifying the other CPUs to which said requesting CPU has sent processing requests;

end detecting means for detecting end of processing at all of said other CPUs to which processing requests have been sent by monitoring end-of-process reports received from said other CPUs while referencing contents of said storing means;

selecting means for selectively combining all of said end-of-process reports from said other CPUs according to the contents of said end-of-process reports from said other CPUs and according to a predetermined priority; and means for producing a single end report from said selectively combined end-of-process reports when said end detecting means detects end of processing at all of said other CPUs to which processing requests were sent.

* * * * *